US012410197B2

United States Patent
Sava Gallis et al.

(10) Patent No.: US 12,410,197 B2
(45) Date of Patent: Sep. 9, 2025

(54) TUNABLE RARE EARTH METAL-ORGANIC FRAMEWORKS FOR COMPLEX OPTICAL TAGS

(71) Applicant: National Technology & Engineering Solutions of Sandia, LLC, Albuquerque, NM (US)

(72) Inventors: Dorina F. Sava Gallis, Albuquerque, NM (US); Lauren E. S. Rohwer, Albuquerque, NM (US); Kimberly Butler, Albuquerque, NM (US); Jacob Ivan Deneff, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 281 days.

(21) Appl. No.: 18/080,044

(22) Filed: Dec. 13, 2022

(65) Prior Publication Data

US 2024/0409561 A1   Dec. 12, 2024

Related U.S. Application Data

(63) Continuation-in-part of application No. 17/479,710, filed on Sep. 20, 2021, now Pat. No. 11,767,468.

(Continued)

(51) Int. Cl.
   *C07F 5/00*   (2006.01)
   *C01B 39/00*  (2006.01)
   (Continued)

(52) U.S. Cl.
   CPC .............. *C07F 5/00* (2013.01); *C01B 39/00* (2013.01); *G06K 19/0614* (2013.01); *G06K 7/10544* (2013.01); *G06K 19/06084* (2013.01)

(58) Field of Classification Search
   CPC ........ C07F 5/00; C01B 39/00; G06K 19/0614
   See application file for complete search history.

(56) References Cited

U.S. PATENT DOCUMENTS

| | | | | |
|---|---|---|---|---|
| 2005/0208543 | A1* | 9/2005 | Vann | B82Y 5/00 435/6.12 |
| 2010/0072424 | A1* | 3/2010 | Petoud | C07C 65/28 252/301.16 |

(Continued)

OTHER PUBLICATIONS

Omagari et al., Critical Role of Energy Transfer Between Terbium Ions for Suppression of Back Energy Transfer in Nonanuclear Terbium Clusters, www.nature.com/scientificreports, received: Aug. 4, 2016, accepted: Oct. 21, 2016, Published: Nov. 15, 2016 (Year: 2016).*

(Continued)

*Primary Examiner* — Hugh Maupin
(74) *Attorney, Agent, or Firm* — Kevin W. Bieg

(57) ABSTRACT

The invention provides a powerful design strategy towards next-generation, multiplexed, lifetime-encoded tags via engineering intermetallic energy transfer in heterometallic metal-organic frameworks based on nonanuclear metal clusters. Precise manipulation of the luminescence decay dynamics over a wide microsecond regime can be achieved owing to the control over metal ordering in these systems. As an example of the invention, a novel, dynamic double encoding method that uses the braille alphabet was achieved by incorporating the materials into photocurable inks patterned on glass and interrogated via digital high-speed imaging. The facile synthesis and interrogation of these heterometallic metal-organic frameworks having complex and tunable optical properties enables next-generation, multiplexed optical tags.

22 Claims, 10 Drawing Sheets

Related U.S. Application Data

(60) Provisional application No. 63/086,419, filed on Oct. 1, 2020.

(51) Int. Cl.
  *G06K 19/06* (2006.01)
  *G06K 7/10* (2006.01)

(56) References Cited

U.S. PATENT DOCUMENTS

| | | | | |
|---|---|---|---|---|
| 2015/0258034 | A1* | 9/2015 | Boyes | A61K 33/242 424/490 |
| 2016/0102108 | A1* | 4/2016 | Eddaoudi | B01J 31/1691 556/1 |
| 2018/0024058 | A1* | 1/2018 | Kim | G01N 21/6447 436/93 |
| 2021/0120193 | A1* | 4/2021 | Swager | G01J 5/02 |
| 2022/0204838 | A1* | 6/2022 | Li | C09K 11/06 |
| 2023/0011770 | A1* | 1/2023 | Rosi | G01N 21/77 |

OTHER PUBLICATIONS

Omagari et al. (Critical Role of Energy Transfer Between Terbium Ions for Suppression of Back Energy Transfer in Nonanuclear Terbium Clusters, Scientific Reports, www.nature.com/scientificreports, Received: Aug. 4, 2016, Accepted: Oct. 21, 2016, Published: Nov. 15, 2016, DOI: 10.1038/srep37008) (Year: 2016).*
Ren, W. et al., "Optical Nanomaterials and Enabling Technologies for High-Security-Level Anticounterfeiting," Advanced Materials, 2020, vol. 32, 1901430.
Kalytchuk, S. et al., "Carbon Dot Fluorescence-Lifetime-Encoded Anti-Counterfeiting," ACS Applied Materials Interfaces, 2018, vol. 10, pp. 29902-29908.
Yakunin, S. et al., "Radiative Lifetime-encoded Unicolour Security Tags using Perovskite Nanocrystals," Nature Communications, 2021, vol. 12, 981.
Liu, W. et al., "Designing Lanthanide-doped Nanocrystals with Both Up- and Down-Conversion Luminescence for Anti-counterfeiting," Nanoscale, 2011, vol. 3, pp. 4804-4810.
Deneff, J. et al., "Covert MOF-Based Photoluminescent Tags via Tunable Linker Energetics," ACS Applied Materials Interfaces 2022, vol. 14, pp. 3038-3047.
Deneff, J. et al., "Optical Encoding Via Rational Design of Heterometallic Rare-Earth MOFs," Angewandte Chemie International Edition, 2021, vol. 60, pp. 1203-1211.
Guillerm, V. et al., "Discovery and Introduction of a (3,18)-Connected Net as an Ideal Blueprint for the Design of Metal-Organic Frameworks," Nature Chemistry, 2014, vol. 6, pp. 673-380.
Sava-Gallis, D.S. et al., "Programmable Photoluminescence via Intrinsic and DNA-Fluorophore Association in a Mixed Cluster Heterometallic MOF," ACS Applied Materials Interfaces, 2022, vol. 14, pp. 10566-10576.
White, K. A. et al., "Near-Infrared Luminescent Lanthanide MOF Barcodes," Journal of the American Chemical Society, 2009, vol. 131, pp. 18069-18071.
Allendorf, M. D. et al., "Luminescent Metal-organic Frameworks," I Chemical Society Review, 2009, vol. 38, pp. 1330-1352.
Saraci, F. et al., "Rare-earth Metal-organic Frameworks: rom Structure to applications," Chemical Society Review, 2020, vol. 49, pp. 7949-7977.
Lu. Y. et al., "Tunable Lifetime Multiplexing using Luminescent Nanocrystals," Nature Photonics, 2014, vol. 8, pp. 32-36.
Yao, H. et al., "Hexanuclear Molecular Precursors as Tools to Design Luminescent Coordination Polymers with Lanthanide Segregation," Inorganic Chemistry, 2021, vol. 60, pp. 16782-16793.
Mouche, R. et al., "Highly Luminescent Europium-Based Heteroleptic Coordination Polymers with Phenantroline and Glutarate Ligands," Inorganic Chemistry 2021, vol. 60, pp. 3707-3718.
Pointel, Y. et al., "Rational Design of Dual IR and Visible Highly Luminescent Light-Lanthanides-Based Coordination Polymers," Inorganic Chemistry, 2020, vol. 59, pp. 10673-10687.
Abdulhalim, R. et al., "A Fine-Tuned Metal-Organic Framework for Autonomous Indoor Moisture Control," Journal of the American Chemical Society, 2017, vol. 139, pp. 10715-10722.
Muller-Buschbaum, K. et al., "MOF based luminescence tuning and chemical/physical sensing," Microporous and Mesoporous Materials, 2015, vol. 216, pp. 171-199.
Quezada-Novoa, V. et al., "Building a shp: A Rare-Earth Metal-Organic Framework and Its Application in a Catalytic Photooxidation Reaction," Chemistry of Materials, 2021, vol. 33, pp. 4163-4169.

* cited by examiner

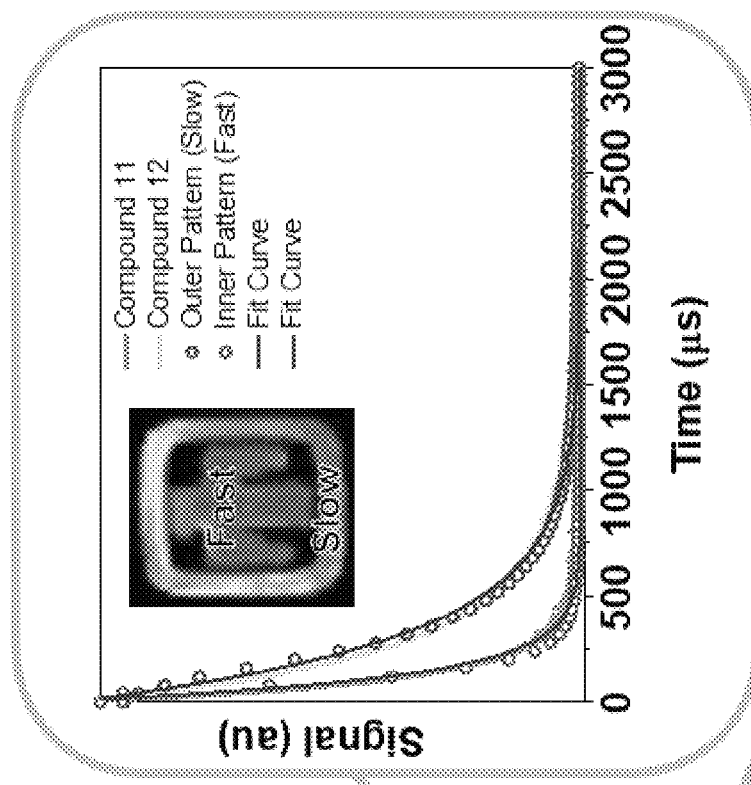
FIG. 6F
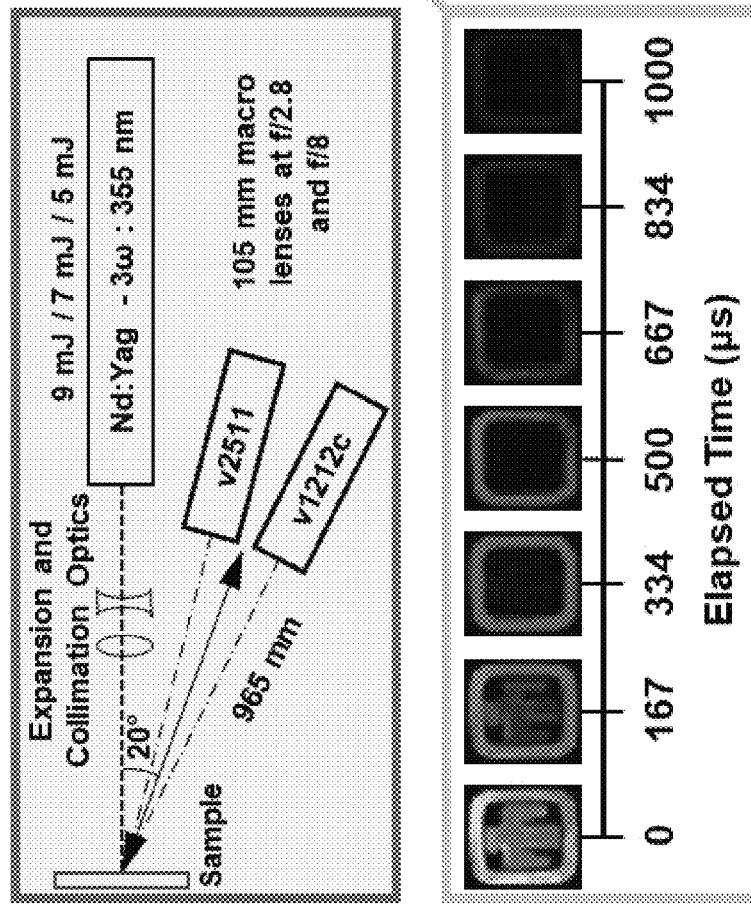
FIG. 6H
FIG. 6G

TUNABLE RARE EARTH METAL-ORGANIC FRAMEWORKS FOR COMPLEX OPTICAL TAGS

CROSS-REFERENCE TO RELATED APPLICATIONS

This application is a continuation-in-part of U.S. application Ser. No. 17/479,710, filed Sep. 20, 2021, which claims the benefit of U.S. Provisional Application No. 63/086,419, filed Oct. 1, 2020, both of which are incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to optical tags and, in particular, to tunable rare earth metal-organic frameworks for complex optical tags.

BACKGROUND OF THE INVENTION

As markets become more complex and globalized, more sophisticated methods are required to address supply chain management challenges and integrity-checking for highly complex systems and valuable items or commodities. To meet this growing challenge, optical tags, which leverage the luminescent properties of materials for encoding, have been explored and advanced significantly in recent years. See W. Ren et al., *Adv. Mater.* 2020, 32, 1901430 (2020); S. Kalytchuk et al., *ACS Appl. Mater. Interfaces* 10, 29902 (2018); and S. Yakunin et al., *Nat. Commun.* 12, 981 (2021). To be effective, such tags must offer rapid, low-cost, and unambiguous verification, and, crucially, they must be secure against counterfeiting. Because static, monochromatic luminescence is easy to duplicate using commonly available dyes, multilayered encoding must become the state of the art, reducing the likelihood that any counterfeit will duplicate all of the measured properties. See Y. Liu et al., *Nanoscale* 3, 4804 (2011). To enhance security, viable materials must combine many possible states, both overt and covert, including emission, lifetime, scattering, and absorption. See L. Qin et al., *Nat. Commun.* 12, 699 (2021). In agreement with this premise, several recently published works have described potential new options for secure encoding, drawn from many classes of materials, including carbon dots, metallic nanoparticles, and perovskites. See W. Ren et al., *Adv. Mater.* 2020, 32, 1901430 (2020); M. Ding et al., *Adv. Mater.* 32, 2002121 (2020); C. Zhang et al., *Adv. Mater.* 34, 2109496 (2022); B. Zhou et al., *Adv. Mater.* 31, 1806308 (2019); H. Liu et al., *Adv. Mater.* 31, 1807900 (2019); S. Kalytchuk et al., *ACS Appl. Mater. Interfaces* 10, 29902 (2018); Z. Wang et al., *J. Mater. Chem. C* 9, 4847 (2021); X. Liu et al., *ACS Appl. Mater. Interfaces* 11, 30146 (2019); M. Tan et al., *ACS Nano* 14, 6532 (2020); and S. Yakunin et al., *Nat. Commun.* 12, 981 (2021). However, both existing materials and many of these proposed new materials suffer from critical drawbacks: (i) monochromatic and/or broad emission bands, unsuited for multi-tiered screening; (ii) complex synthesis methods, which are time-consuming and cost-ineffective; (iii) an amorphous physical structure, which makes complex characterization and manipulation extremely challenging; and (iv) highly specialized interrogation equipment, which restricts real-life implementation. See S. Yakunin et al., *Nat. Commun.* 12, 981 (2021); N. Katumo et al., *Adv. Mater. Technol.* 6, 2100047 (2021); X. Liu et al., *ACS Appl. Mater. Interfaces* 11, 30146 (2019); X. Wei et al., *ACS Appl. Nano Mater.* 5, 1161 (2022); S. Kalytchuk et al., *ACS Appl. Mater. Interfaces* 10, 29902 (2018); and Z. Gao et al., *Angew. Chem. Int. Ed.* (2020).

SUMMARY OF THE INVENTION

The present invention is directed to an optical tag comprising a rare earth metal-organic framework (REMOF), the REMOF comprising at least one high-energy donor rare earth and at least one lower-energy acceptor rare earth, wherein the rare earths are arranged in polynuclear metal clusters interconnected by carboxylic acid-based linkers. The optical tag can further comprise at least one optically inactive higher-energy rare earth that modulates the distance between the at least one high-energy donor rare earth and the at least one lower-energy acceptor rare earth in the polynuclear clusters.

The invention is further directed to a method to optically tag an object, comprising associating an optical tag, comprising a REMOF, the REMOF comprising at least one high-energy donor rare earth and at least one lower-energy acceptor rare earth, wherein the rare earths are arranged in polynuclear metal clusters interconnected by carboxylic acid-based linkers, with the object; and interrogating at least two encoding properties of the optical tag in order to authenticate the object. The optical tag can further comprise at least one optically inactive higher-energy rare earth. The at least two encoding properties can comprise an emission spectrum, a luminescence lifetime, or a composition of the at least one of the high-energy donor rare earth and/or the at least one of the low-energy acceptor rare earth and/or the at least one optically inactive higher-energy rare earth. The optical tag can comprise a multiple-encoded dynamic tag comprising at least two different concentrations of the at least one high-energy donor rare earth and the at least one lower-energy acceptor rare earth at different spatial locations of an encoded pattern, wherein the at least two different concentrations have similar emission spectra but different luminescence lifetimes and wherein the interrogating step comprises measuring the intensity of emission of the encoded pattern at a specified time after optically exciting the optical tag.

The effect of metal composition and ordering on the luminescence lifetimes of REMOFs was demonstrated by controlling the energy transfer mechanisms (both ligand-to-metal and metal-to-metal) within the structure. For example, when optically inactive (Gd), visible emitter (Eu), and near-infrared (NIR) emitter (Yb) are combined and subjected to an initial energy input via direct linker excitation, the energy will cascade down to the Eu and Yb by the antenna effect and metal-to-metal charge transfer. After the initial excitation, the high-energy Eu feeds the low-energy Yb. If no Gd is present to separate them, and the ratio of Yb to Eu is high, then this effect shortens the visible lifetime and prolongs the NIR lifetime; however, if there are Gd spacers, then the energy drain from Eu is obstructed, and the visible lifetime is extended significantly. Indeed, with REMOFs comprising multiple rare earths, different compositions can have similar lifetimes, such that the composition and lifetime can be varied largely independently. The attractiveness of this method lies in leveraging the nonanuclear, wellspaced MOF clusters to control intermetallic ordering and facilitate energy transfer without resorting to patterning or multilayered synthesis.

As another example, in the visible range, lifetime can be modified by altering the ratio of Yb to Eu, with the Yb receiving energy from the Eu, shortening the characteristic time of the compound as the ratio is increased. The addition of Gd dilutes the emitters, creating a barrier to energy transfer and increasing the lifetimes once again. The lifetime is governed by the probability of Yb metal centers neighboring Eu metal centers. In the NIR range, the addition of Eu to Yb-containing compounds results in a long, low intensity tail for the emission lifetimes. In this case, the Eu acts as a reservoir of energy for the Yb long after the initial excitation energy from the linker has been emitted or dispersed.

Finally, the creation of a lifetime-encoded message was demonstrated utilizing both simple laboratory equipment with delayed fluorescence measurements and digital high-speed imaging with pulsed excitation. The compounds in this optical tag could not be differentiated by static excitation, but through their lifetimes, creating dynamic tags that are revealed or change over time. These lifetimes are long enough to be measured by basic lab equipment, but not so long as to be visible to the unaided eye to combine accessibility with security.

The manipulation and practical application of the REMOF materials enables facile synthesis and interrogation of complex, next-generation tags, both accessible for widespread use and secure against counterfeiters. The incorporation of a diluting metal expands the design space of potential tag materials, and serves to decouple their spectrum, composition, and lifetime to make simultaneous duplication of each property significantly more difficult. This invention provides a powerful materials design strategy that can be expanded to a diverse set of REMOFs with varying organic or metallic constituents, enabling a large library of tags with unique, multilayered encoding.

BRIEF DESCRIPTION OF THE DRAWINGS

The detailed description will refer to the following drawings, wherein like elements are referred to by like numbers.

FIG. 5A is a representation for a dynamic tag that shows the transition from undifferentiated dots to the message over time based on different compound lifetimes. FIG. 5B is a representation for a double-encoded dynamic tag that shows an initial encoding based on emission intensity via compound concentration in each well, with a final encoding based on different compound lifetimes. The intensity of each red dot is based on experimental data.

FIGS. 6A-6H illustrate a demonstration of patterning and interrogating a tag made with compounds 11 and 12 in an ink. FIG. 6A is a diagram detailing stencil design and etching. FIG. 6B is a stencil composed of painters' tape on glass. FIG. 6C is an inked Sandia thunderbird logo under UV light, held in hand for scale. FIG. 6D is an inked logo under ambient light. FIG. 6E is an inked logo under UV light. FIG. 6F is a schematic illustration of the laser excitation and digital high-speed imaging setup used to capture the decay of the logo. FIG. 6G is a time-lapse of tag emission after pulsed laser excitation, showing two distinct lifetimes for the thunderbird and border respectively. FIG. 6H shows decay data curves and fit curves for each section of the logo, derived from digital high-speed images, compared to the decay of pure compound 11 and 12 described above.

DETAILED DESCRIPTION OF THE INVENTION

Figure 1A:
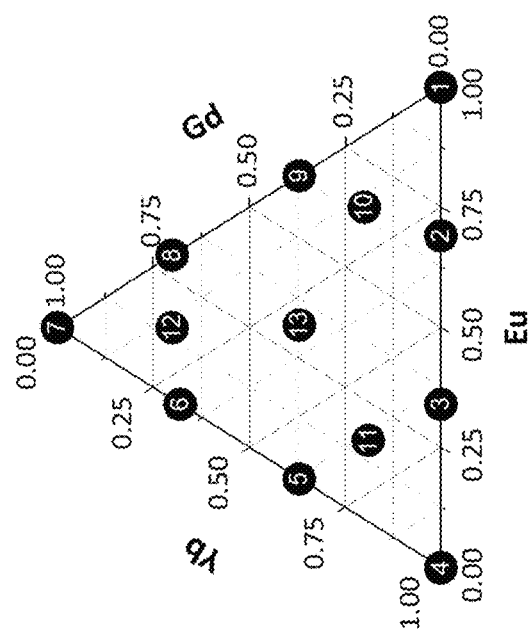
FIG. 1A is a ternary diagram of metal content showing the composition of each compound.

The present invention is directed to polynuclear rare earth (RE)-based metal-organic frameworks (MOFs) (i.e., REMOFs) as a class of materials for tunable, multiplexed encoding. See J. I. Deneff et al., *ACS Appl. Mater. Interfaces* 14, 3038 (2022); J. I. Deneff et al., *Angew. Chem. Int. Ed.* 60, 1203 (2021); V. Guillerm et al., *Nat. Chem.* 6, 673 (2014); D. F. Sava Gallis et al., *ACS Appl. Mater. Interfaces* 14, 10566 (2022); and K. A. White et al., *J. Am. Chem. Soc.* 131, 18069 (2009). REs possess narrow absorption and emission bands across a wide range of wavelengths that allow for a high degree of specificity in excitation and emission, a property that is difficult to duplicate with the broad-band materials (e.g., organic molecules or carbon dots). See J. Wang et al., *Inorgan. Chem.* 58, 2659 (2019); and Z. Wang et al., *J. Mater. Chem. C* 9, 4847 (2021). Likewise, MOFs are attractive for tagging because they have (i) straightforward synthetic processes, that generally allow for one-pot synthesis; (ii) periodic crystal structures, allowing structural manipulation and in-depth characterization at the atomic level; and (iii) sensitizing organic linkers in a low-density framework, which only require a low amount of optically active REs to emit a readable signal. See M. D. Allendorf et al., *Chem. Soc. Rev.* 38, 1330 (2009); and F. Saraci et al., *Chem. Soc. Rev.* 49, 7949 (2020).

Lifetime-encoded materials are particularly attractive for next-generation multiplexed optical tags due to their increased level of security that cannot be easily circumvented. Distinct luminescence lifetimes allow spectrally overlapped tags to be distinguished in the time domain, and can create images that change over time to reveal hidden patterns or additional data. See S. Kalytchuk et al., *ACS Appl. Mater. Interfaces* 10, 29902 (2018); S. Yakunin et al., *Nat. Commun.* 12, 981 (2021); and Y. Lu et al., *Nat. Photonics* 8, 32 (2014). However, a fundamental understanding of how both structure and composition affect the energy transfer pathways that govern photoluminescent properties is required to manipulate the fluorescence lifetime. The challenges associating with this understanding, and the difficulty of controlling the material structure, have limited the rational design of materials with potential for lifetime-encoding. See S. Kalytchuk et al., *ACS Appl. Mater. Interfaces* 10, 29902 (2018); S. Yakunin et al., *Nat. Commun.* 12, 981 (2021); B. Zhou et al., *Adv. Mater.* 31, 1806308 (2019); X. Liu et al., *ACS Appl. Mater. Interfaces* 11, 30146 (2019); C. Lin et al., *Nanoscale* 11, 6584 (2019); and Y. Ou et al., *Angew. Chem. Int. Ed. Engl.* 59, 23810 (2020).

Control over the energy transfer pathways can result in an ideal platform of lifetime-encoded optical tags. These energy transfer pathways are affected by both the excited state energies of individual components of the tag and the distance between them. Owing to the periodic structure of polynuclear REMOFs, intermetallic distances can be controlled by cluster and ligand geometry, making the energy transfer relationships between the various components of the REMOF much easier to understand and manipulate. See H. Yao et al., *Inorgan. Chem.* 60, 16782 (2021); and R. Maouche et al., *Inorgan. Chem.* 60, 3707 (2021). By controlling the linker identity and geometry, it is possible to facilitate or impede internal energy transfer pathways between the emissive REs, and therefore modulate the luminescence lifetimes of the REMOF they are a part of. Related techniques have been used in MOFs to control emission color or intensity, but the concept has not been adapted for fine control of luminescence lifetime. See H. Yao et al., *Inorgan. Chem.* 60, 16782 (2021); R. Maouche et al., *Inorgan. Chem.* 60, 3707 (2021); and Y. Pointel et al., *Inorgan. Chem.* 59, 10673 (2020).

Therefore, to enable multiplexed encoding in tag materials, the present invention decouples luminescence (emission) spectra, lifetime, and composition so that each can be used independently for encoding. The invention is implemented through a targeted materials design strategy: first, confine the dominant metal-metal interactions to intra-cluster vs. inter-cluster interactions via linker geometry, which allows control of the intermetallic energy transfer mechanism; and second, segregate a high-energy donor RE and lower-energy acceptor RE by incorporating an optically inactive RE to modulate the average distance between the donor and acceptor without changing the linker or overall structure of the MOF. See H. Yao et al., *Inorgan. Chem.* 60, 16782 (2021). In doing so, inclusion of an inactive element vastly expands the potential design space for lifetime encoding, because it effectively modifies the RE interactions without impacting either the linker identity or the ratio of donor to acceptor emitters.

Preferably, the high-energy donor RE emits in the visible range and has a longer lifetime (e.g., hundreds of microseconds) compared to the acceptor. Preferred RE donors include Eu and Tb. Other exemplary RE donors with shorter lifetimes include Pr, Sm, and Dy. Exemplary RE acceptors include Yb, Nd, and Er. Exemplary optically inactive REs include Gd, La, and Y. For example, the linker can comprise a carboxylic acid-based linker, such as a di-, tri-, tetra-, or hexacarboxylic acid.

The optical tag can be associated with an object and the encoding properties (emission spectrum, luminescence lifetime, composition) of the optical tag can be interrogated. For example, the optical tag be printed or patterned on the object according to an encoding pattern. A variety of encoding patterns can be used, including braille, letters, barcodes, etc. Likewise, there are variety of methods to interrogate the encoding properties of the optical tag, including lifetime spectroscopy and lifetime imaging. Lifetime spectroscopy typically provides a numerical read out, as with a microplate reader or laser/detector read out, as described herein. A fluorescence spectrometer can also be used. Lifetime imaging provides a physical image, such as with laser excitation combined with a fast imaging camera or lifetime microscope, as will be described herein.

As an example of the invention, a family of heterometallic REMOFs with highly tunable emission lifetimes over a wide microsecond range scale was designed and synthesized. To accomplish this control, a high-energy donor Eu (visible emitter) was combined with a low-energy acceptor Yb (NIR emitter) and the optically inactive Gd ion with the organic linker 1,2,4,5 tetrakis(4-carboxyphenyl)benzene (TCPB). The TCPB linker was chosen due to its proven ability to direct nonanuclear cluster formation in the MOF and because its large size allows for cluster separation. See J. I. Deneff et al., *Angew. Chem. Int. Ed.* 60, 1203 (2021); and R. G. AbdulHalim et al., *J. Am. Chem. Soc.* 139, 10715 (2017). Due to the energy of its triplet excited state, TCPB also serves as antenna molecule for both Eu and Yb, but not Gd. See J. I. Deneff et al., *ACS Appl. Mater. Interfaces* 14, 3038 (2022); and V. Quezada-Novoa et al., *Chem. Mater.* 33, 4163 (2021). Direct excitation of the linker is hypothesized to initiate an energy cascade first to Eu (which has a long-lived visible emission), then to Yb (which has a short-lived NIR emission), while avoiding any energy transfer to Gd.

To demonstrate the complex intermetallic energy transfer relationships between these three elements, thirteen compositions were synthesized. In a typical synthesis of compounds 1-13, 0.0229 mmol of metal salts ($EuCl_3 \cdot 6H_2O$, $Gd(NO_3)_3 \cdot 6H_2O$, and $Yb(NO_3)_3 \cdot 5H_2O$) in the same proportions as the target composition, 0.0065 mmol (3.65 mg) of TCPB, 4.0075 mmol (561.49 mg) of 2-fluorobenzoic acid, 0.2 mL of $HNO_3$ (3.5 M in DMF), and 2.8 mL of dimethylformamide (DMF) were combined in a glass vial. This mixture was heated to 115° C. for over one hour, held there for 48 hours, then cooled to room temperature. The resulting particles were washed three times with DMF, then exchanged with methanol over three days (the methanol was changed daily).

These compositions included single-, di-, and trimetallic compounds with different elemental ratios, which allowed exploration of a wide range of relevant intermetallic energy transfer scenarios. As anticipated, this set of compounds displayed a wide continuum of overt visible lifetimes (100s of μs) and covert NIR lifetimes (10s to 100s of μs), both of which could be predictably correlated to composition. Importantly, a novel methodology was developed to accurately fit the complex biexponential decay curves characteristic for the compounds described herein, avoiding limitations of the least square method, which is iterative and can be difficult to apply to equations with multiple fit parameters.

To demonstrate the utility of these REMOFs as practical tags, two design strategies were implemented, leveraging two spectrally identical compositions that displayed substantially distinct decay lifetimes in the 100s of μs. First, the braille alphabet interrogated by a microplate reader was used to produce 3 tag exemplars: (i) a static pattern read under constant illumination; (ii) a dynamic pattern that appears undifferentiated under constant illumination but is revealed via lifetime of its constituents; and (iii) a double dynamic pattern that utilizes both concentration and lifetime to change the encoded message depending on when the pattern is read. Second, a proof-of-concept tag was fabricated utilizing the same two compounds suspended in photocurable adhesive and patterned with a laser cut stencil. Laser excitation and high-speed imaging interrogation of this tag showed that the two materials were clearly visually distinguishable on a millisecond time scale. These demonstrations show the utility of these tag materials in facile encoding and interrogation, while more in-depth characterization of a library of tag materials reveals the potential for further layers of encoding including additional lifetime lengths, compositions, and emission spectra.

The materials and methods described herein demonstrate a versatile materials platform capable of dynamic encoding in the time domain and amenable to authentication via tunable emission spectra and composition, enabling the creation of accessible tags with next generation multi-layered encoding.

Composition and Materials Characterization

The exemplary REMOFs contained one, two, or three metals, and were chosen to fill the composition space of the three metal ions (Eu, Yb, and Gd) in consistent increments, depending on the number and ratio of metals incorporated. This design space was created by mapping the compositions and lifetimes together to reveal how composition affects material properties in sufficient detail to predict the properties of future materials. FIG. 1A shows a ternary composition diagram with the specific compositions of compounds 1-13.

Figure 1B:
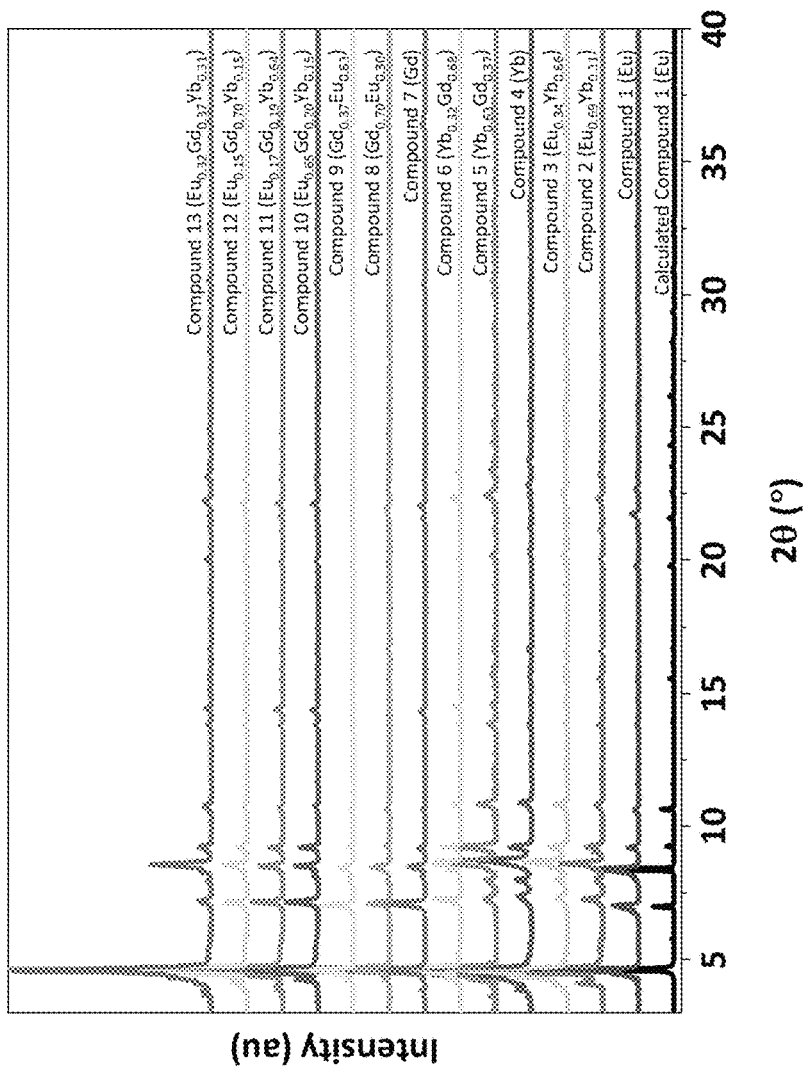
FIG. 1B shows powder X-ray diffraction (PXRD) patterns for each compound, highlighting their consistent crystallinity and the slight variations resulting from different metallic compositions.

The crystallinity and phase identity of each compound was determined via powder X-ray diffraction (PXRD). FIG. 1B shows the PXRD patterns for each compound, along with a calculated pattern for the monometallic Eu composition (compound 1) for comparison. The results indicate that each sample is phase pure and closely matches the calculated ideal structure. Minor shifts in peak location between different compounds are reflective of the different ionic radii of the REs in each compound because different quantities and ratios of REs can slightly distort the crystal lattice.

Figure 1C:
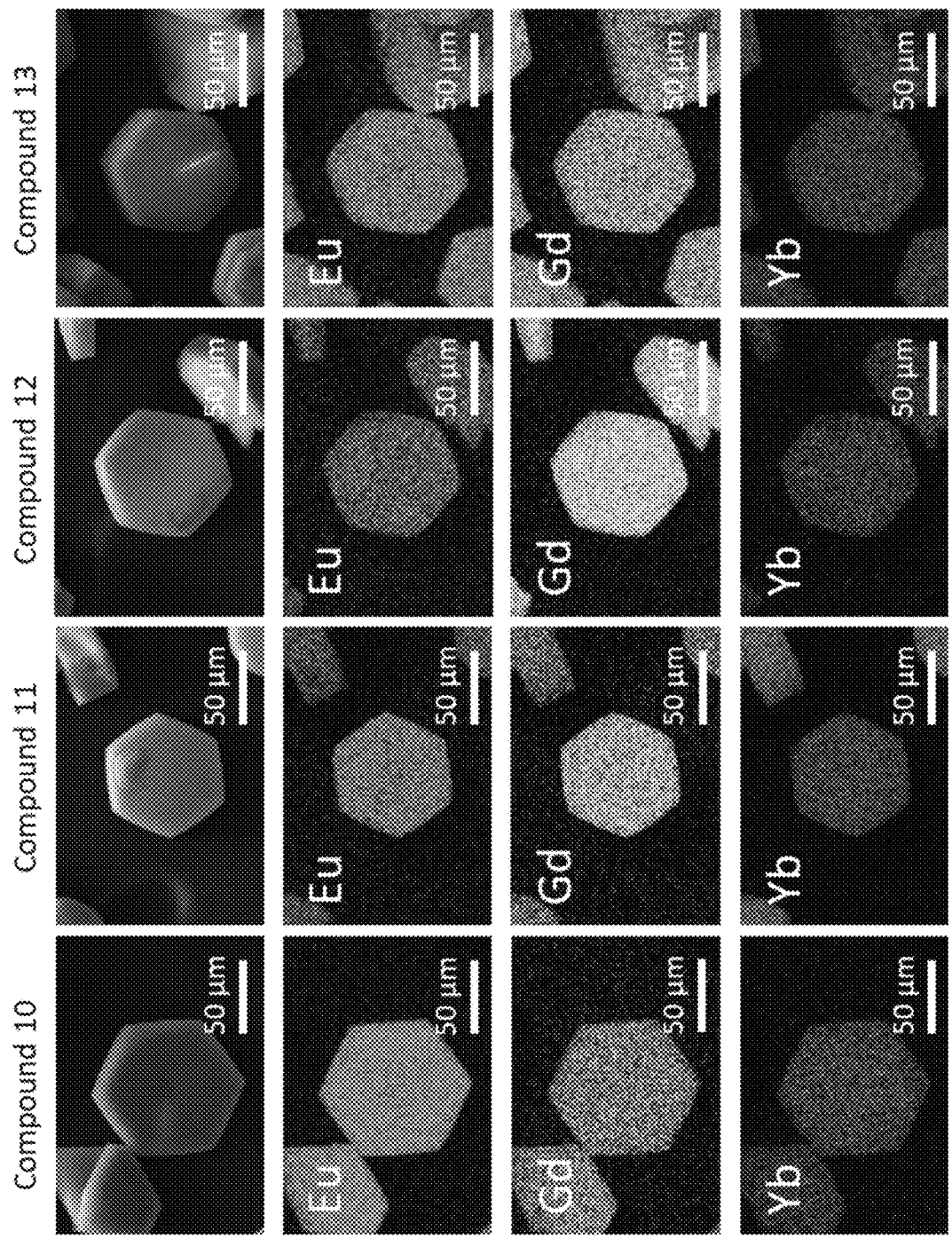
FIG. 1C shows scanning electron microscope (SEM) images and energy dispersive spectroscopy (EDS) maps for the four trimetallic compounds 10-13, highlighting the morphology of the materials and the uniform distribution of metals within each crystal.

The compositions of each di- and trimetal compound were determined via scanning electron microscopy-energy dispersive spectroscopy (SEM-EDS) imaging and analysis. The metallic composition of each compound is given numerically in Table 1 and visually as the ternary diagram in FIG. 1A. Microscopy images and the corresponding elemental maps for the trimetallic compositions (compounds 10, 11, 12, and 13) are shown in FIG. 1C. EDS mapping shows an even distribution of each metal, both within individual crystals and in the bulk sample.

TABLE 1

Compound ID numbers and their fractional metallic compositions.

| Compound | Eu fraction | Gd Fraction | Yb Fraction |
|---|---|---|---|
| 1 | 1 | 0 | 0 |
| 2 | 0.69 | 0 | 0.31 |
| 3 | 0.34 | 0 | 0.66 |
| 4 | 0 | 0 | 1 |
| 5 | 0 | 0.37 | 0.63 |

TABLE 1-continued

Compound ID numbers and their fractional metallic compositions.

| Compound | Eu fraction | Gd Fraction | Yb Fraction |
|---|---|---|---|
| 6 | 0 | 0.68 | 0.32 |
| 7 | 0 | 1 | 0 |
| 8 | 0.30 | 0.70 | 0 |
| 9 | 0.63 | 0.37 | 0 |
| 10 | 0.65 | 0.20 | 0.15 |
| 11 | 0.17 | 0.19 | 0.64 |
| 12 | 0.15 | 0.70 | 0.15 |
| 13 | 0.32 | 0.37 | 0.31 |

This finding is significant, as the synthesis of heterometallic MOFs is generally non-trivial. MOFs that contain multiple metals are desirable for multilayer encoding, combining emission bands and characteristics of many different metals, as well as the properties that emerge from their interactions. Heterometallic MOFs rely on the compatible coordination geometries and crystallization kinetics of these metals to avoid phase or domain separation. See M. Y. Masoomi et al., *Angew. Chem. Int. Ed.* 58, 15188 (2019); and H. Depauw et al., *Chem. Commun.* 53, 8478 (2017). Incompatible metals or metal ratios can result in physical mixtures of different materials, and the loss of both predictable synthesis results and emergent properties from intermetallic interactions. Because REs all possess similar coordination chemistries, sizes, and oxidation states, it is generally assumed that REMOFs can be constructed without domain separation and without limits on the relative metallic composition. See J. Wang et al., *Inorgan. Chem.* 58, 2659 (2019); Y. Pointel et al., *Inorgan. Chem.* 59, 10673 (2020); J. Wang et al., *CrystEngComm* 23, 100 (2021); and H. A. Bicalho et al., *Inorgan. Chem.* 60, 11795 (2021).

Nevertheless, to address concerns regarding uniformity within the heterometallic compositions described herein and ensure that the compounds were uniform, nine points on a single crystal and three areas on different crystals of compound 13 were analyzed. The results indicate that the distribution of elements is indeed uniform both in individual crystals and across the bulk sample.

Intermetallic Energy Transfer

Much of the complexity and tunability of heterometallic polynuclear cluster-based REMOFs is derived from energetic interactions between their components, primarily ligand-to-metal charge transfer (LMCT) and metal-to-metal charge transfer (MMCT). See M. D. Allendorf et al., *Chem. Soc. Rev.* 38, 1330 (2009); and K. Müller-Buschbaum et al., *Microporous Mesoporous Mater.* 216, 171 (2015). The efficiency of these pathways is governed by both the relative energies of each component and the distance between them. Generally, components with high-energy excited states will donate energy non-radiatively to components with low-energy excited states, provided that the elements are in close physical proximity to each other and that the energy levels are sufficiently different to prevent losses via back-transfer. See Y. Liu et al., *Nanoscale* 3, 4804 (2011); and M. Latva et al., *J. Lumin.* 75, 149 (1997).

Figure 2A:
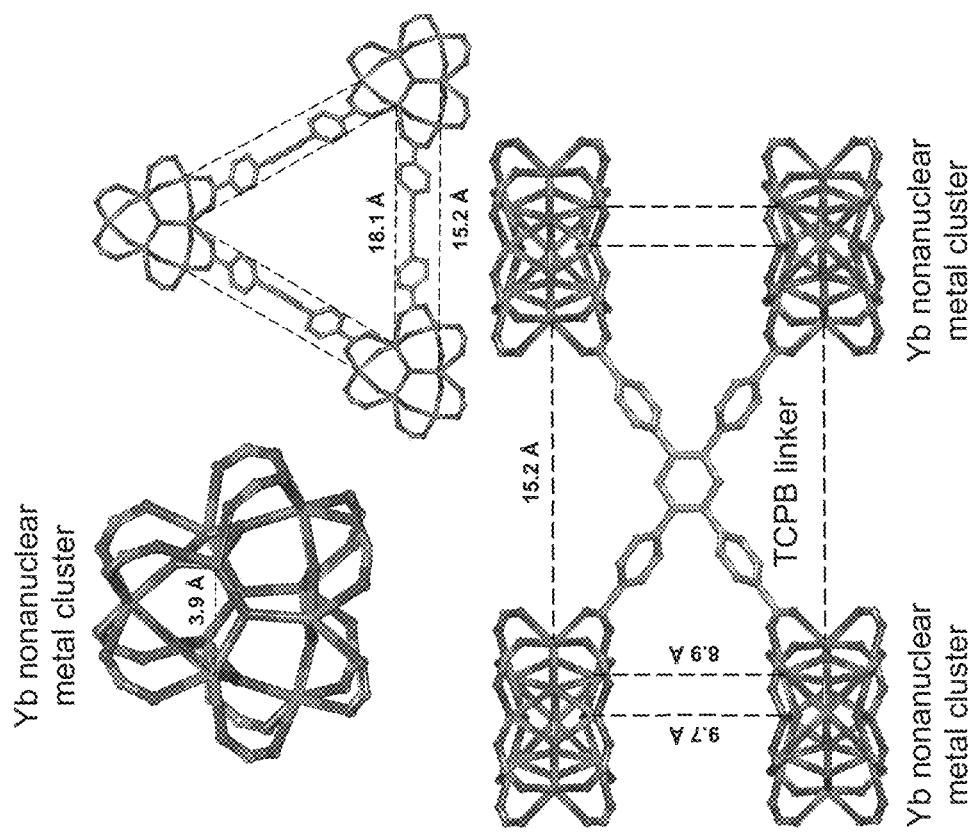
FIG. 2A is a ball and stick representation of MOF structure showing the intra-cluster and inter-cluster intermetallic distances in compound 4, YbTCPB. Atom color scheme: C gray, O red, Yb green. H atoms are omitted for clarity.

The exemplary three-periodic MOF material studied here is made up of 12-connected nonanuclear RE clusters bridged by TCPB linkers. See J. I. Deneff et al., *ACS Appl. Mater. Interfaces* 14, 3038 (2022); J. I. Deneff et al., *Angew. Chem. Int. Ed.* 60, 1203 (2021); and V. Guillerm et al., Nat. Chem. 6, 673 (2014). Within individual clusters (intra-cluster) the intermetallic distance is 3.9 Å, while distances between clusters (inter-cluster) are between 8.9 Å and 18.0 Å, as shown in FIG. 2A.

Figure 2B:
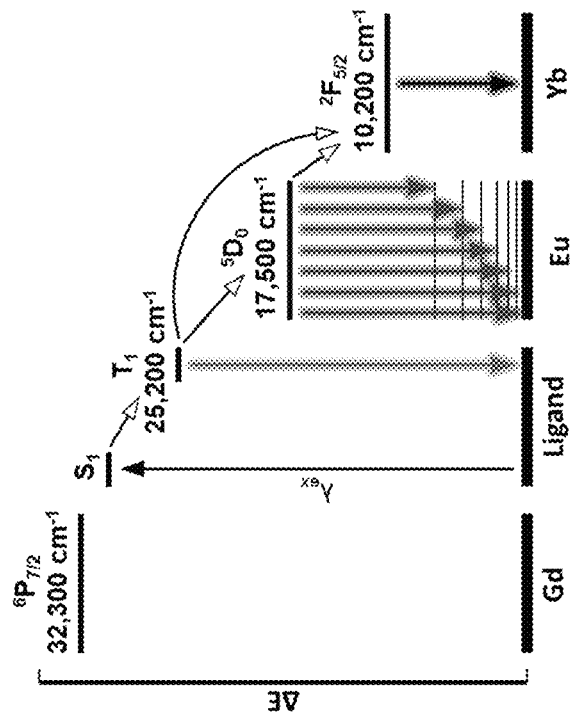
FIG. 2B is an energy transfer diagram illustrating the relationships between each component of the compounds when the ligand is excited directly ($\lambda_{ex}$=337 nm).

Given that intermetallic energy transfer is known to decline significantly beyond 10 Å, these distances indicate that energy transfer between individual metal ions in the compositions would primarily occur within clusters. See R. Maouche et al., *Inorgan. Chem.* 60, 3707 (2021). This paradigm is significant in the context of correlating metal ordering at the molecular level and the impact of such ordering on the metal-to-metal energy transfer and resulting photophysical properties. To help explain the photoluminescence (PL) response of each compound to the direct excitation of the linker, the energy transfer pathways between the different components of the MOFs are shown in FIG. 2B.

Figure 2D:
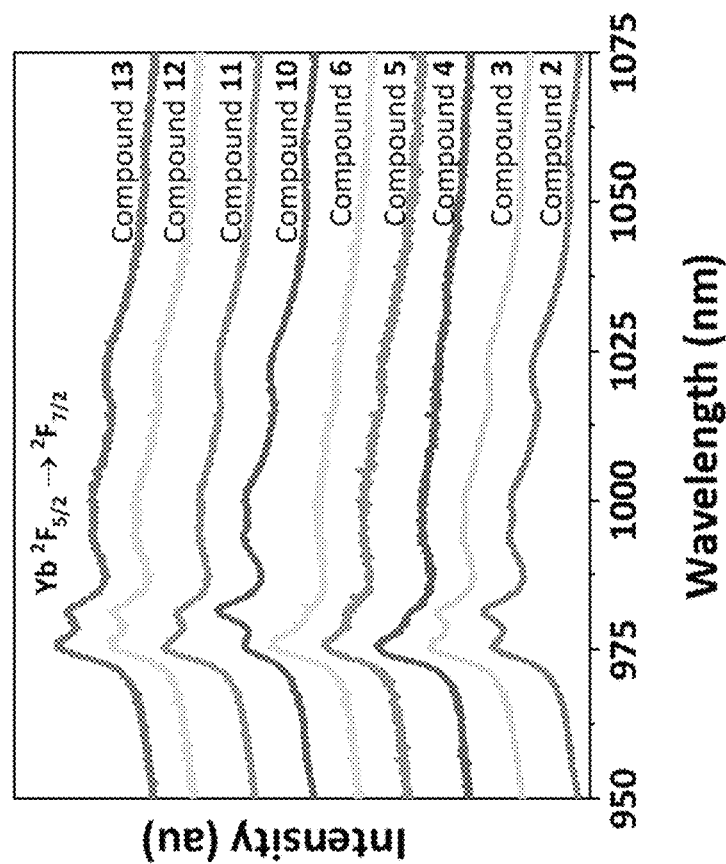
FIG. 2D shows emission spectra for select compounds in the NIR range, with the excitation wavelength 394 nm; all peaks associated with Yb.
Figure 2C:
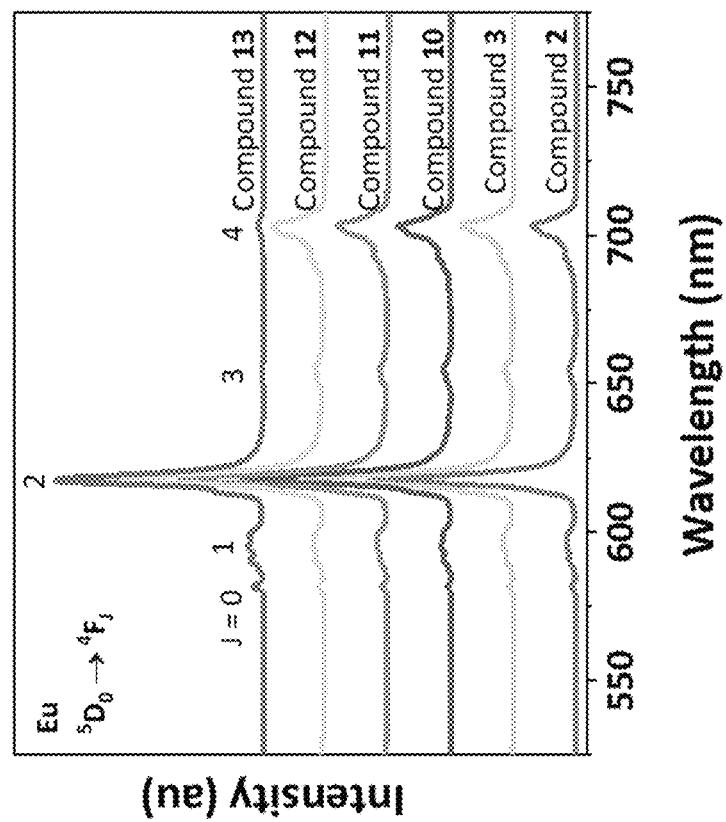
FIG. 2C shows emission spectra for select compounds in the visible range, with the excitation wavelength 394 nm; all peaks associated with Eu.

Further evidence for the dominance of intra-cluster energy transfer is found in the PL spectra for the compounds, shown in FIGS. 2C and 2D. For example, when Eu is excited directly with 394 nm light, characteristic Eu emission peaks in the visible range are observed ($^5D_0 \rightarrow {}^4F_j$ where j is equal to 0 at 582 nm, 1 at 592-600 nm, 2 at 617 nm, 3 at 655 nm, and 4 at 704 nm). Critically, Yb emission in the NIR is observed between 970 nm and 1050 nm under the same excitation wavelength, demonstrating Eu-to-Yb energy transfer. See P. A. Tanner, in *Lanthanide Luminescence: Photophysical, Analytical and Biological Aspects*, (Eds: P. Hänninen, H. Härmä), Springer Berlin Heidelberg, Berlin, Heidelberg (2011). As expected, Gd does not affect the PL spectra of materials that contain it, due to its higher energy excited state.

The environment surrounding some RE ions is known to affect their luminescence; for example, the site symmetry of the Eu is indicated by the splitting of its $^5D_0 \rightarrow {}^7F_1$ transition emission peak. See P. A. Tanner, in *Lanthanide Luminescence: Photophysical, Analytical and Biological Aspects*, (Eds: P. Hänninen, H. Härmä), Springer Berlin Heidelberg, Berlin, Heidelberg (2011). The Yb signal is also typically split into several peaks in the 970 to 1050 nm range, which reflects the local concentration of Yb and other elements in the material. See R. Zhou et al., *Phys. Status Solidi B* 249, 818 (2012). Thus, all of the compounds in FIG. 2D show primary Yb emission peaks located at 975 and 982 nm, which change in relative intensity primarily in response to the presence or absence of Eu in the compound. This phenomenon of changing relative intensities reflects the local environment of the Yb ions and would not occur unless the metals were mixed within the same cluster and interacting in that space.

Finally, infrared (IR) transmission spectroscopy was used to probe the vibrational modes around metal clusters within the different compounds. The vibrational modes associated with bridging the OH groups in the MOF metal clusters can be found in the 800-1000 cm$^{-1}$ range, and changes in the ratios of available metals have been shown to cause peaks to shift or emerge to reflect the different environments. See K. I. Hadjiivanov et al., *Chem. Rev.* 121, 1286 (2021); and F. Nouar et al., *Chem. Commun.* 48, 10237 (2012). Because of the similar coordination chemistry of the different REs, new peaks were not expected to form in response to changing composition; however, peak shifts were observed in the monometallic compounds (particularly compounds 1 and 4), primarily around 910 cm$^{-1}$ and 845 cm$^{-1}$. Mixed metal compounds show intermediate peak shifts that correspond to the relative quantities of Yb and Eu. Peaks shift rather than split due to the presence of OH groups, which bridge both single metals and mixed metals. These results further support the hypothesis of intra-cluster heterometallic mixing rather than distinct homometallic clusters.

Photoluminescent Lifetime Measurements

To probe the entire complex energy transfer cascade from ligand-to-metal and metal-to-metal, the luminescence lifetime of each emitting compound was measured. Both visible and NIR decay dynamics were measured using 337 nm light from a pulsed nitrogen laser to target direct linker excitation. Based on its emission spectrum, the donor state energy of TCPB is approximately 26,500 cm$^{-1}$, while the primary emissive states of Gd, Eu, and Yb are 32,300 cm$^{-1}$, 17,500 cm$^{-1}$, and 10,200 cm$^{-1}$ respectively. See J. I. Deneff et al., *ACS Appl. Mater. Interfaces* 14, 3038 (2022); Y. Pointel et al., *Inorgan. Chem.* 59, 10673 (2020); and P. A. Tanner, in *Lanthanide Luminescence: Photophysical, Analytical and Biological Aspects*, (Eds: P. Hänninen, H. Härmä), Springer Berlin Heidelberg, Berlin, Heidelberg (2011). Because of their relative energy levels, a cascade of energy transfer interactions were anticipated: Eu was excited by energy transfer from the linker, and Yb was excited by energy transfer from both the linker and neighboring Eu ions.

Figure 3B:
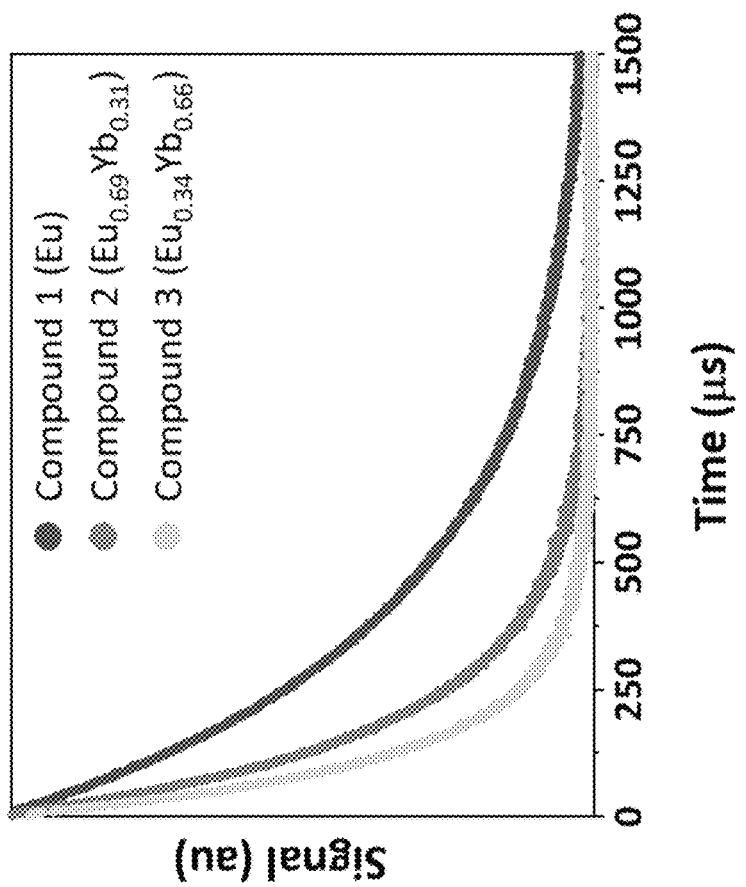
FIGS. 3A-3C show visible decay curves for all compounds containing Eu.
Figure 3A:
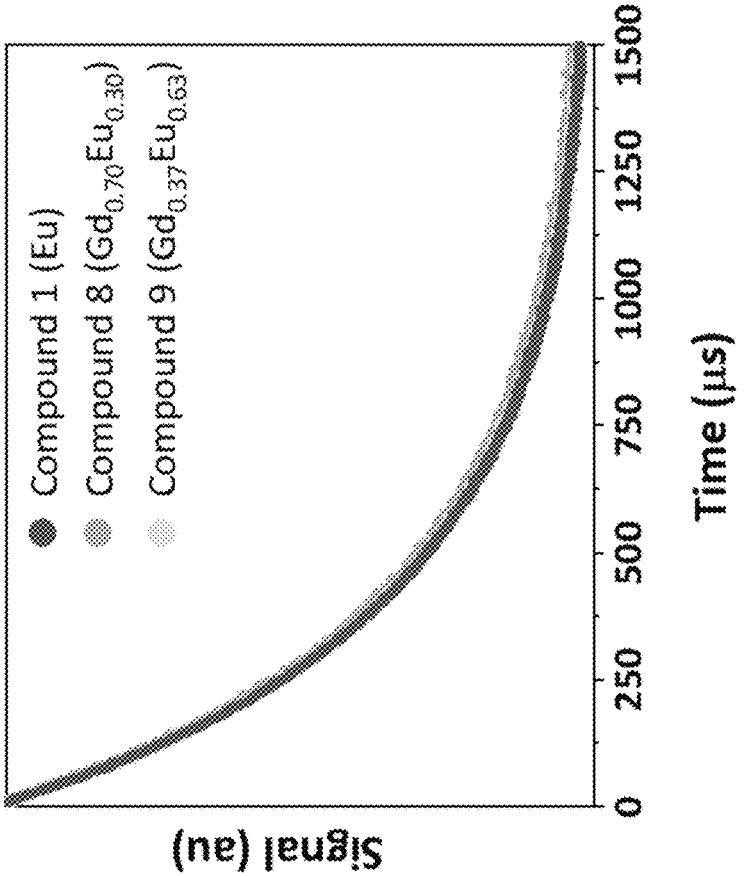
Figures 3C, 3D:
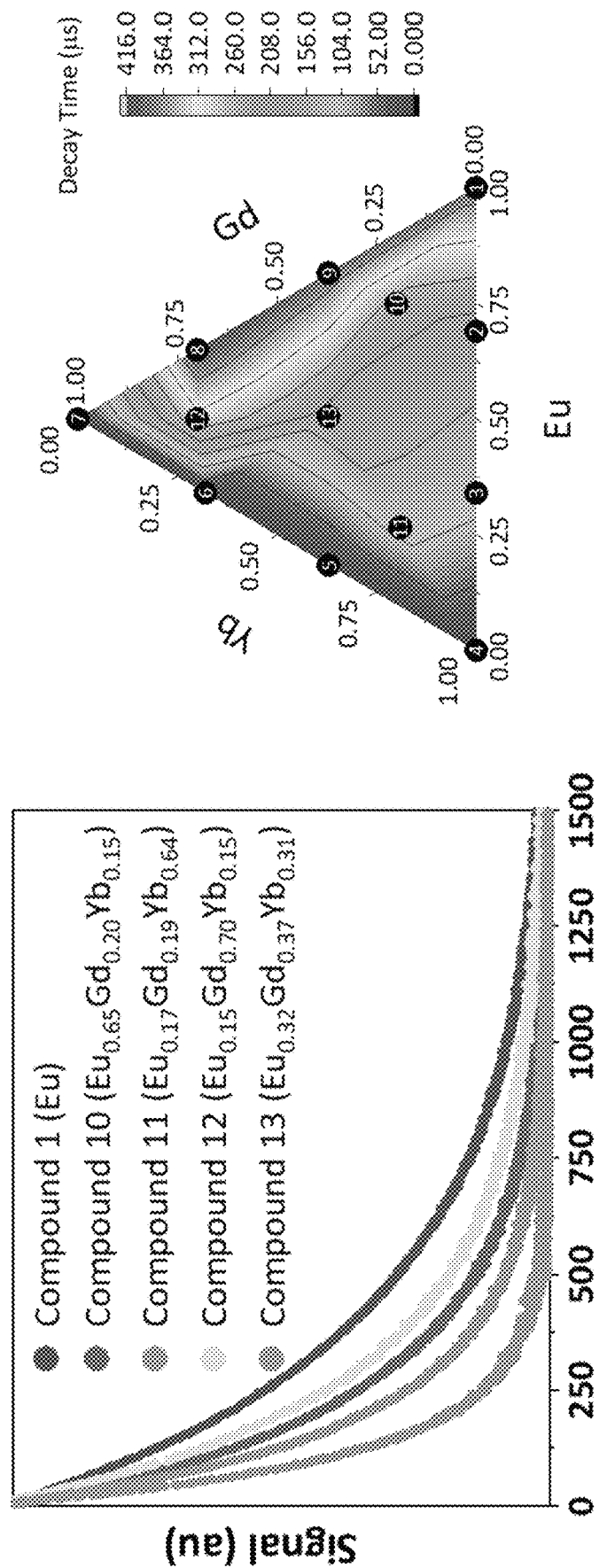
FIG. 3D is a ternary diagram of the different compounds with colors corresponding to the lifetime of each. These show the relative effects of Gd and Yb content on emission lifetimes of Eu in these materials.

Photoluminescent decays in the visible range in compounds 1-3 and 8-13 were measured at 620 nm to target the $^5D_0 \rightarrow {}^7F_2$ transition in Eu and fitted by a single exponential function (FIGS. 3A-3C). The characteristic decay times for these fitting functions are given in Table 2. FIG. 3A shows data for compounds 1, 8, and 9, and demonstrates that diluting Eu with the inactive metal Gd has little effect on the lifetime of the material, because the characteristic decay time is approximately 400 µs regardless of composition. FIG. 3B shows that, when Yb is included with Eu in compounds 2 and 3, the energy from a long-lived emitter (Eu) drains to a short-lived one (Yb), resulting in an overall decrease in the visible lifetime from 388 µs for the pure Eu compound 1 to 125 µs for the Yb rich compound 3.

TABLE 2

Characteristic times for the single exponential decay of each compound that emits visible light.

| Compound | 1 | 2 | 3 | 8 | 9 | 10 | 11 | 12 | 13 |
|---|---|---|---|---|---|---|---|---|---|
| τ (µs) | 388 | 182 | 125 | 415 | 390 | 240 | 122 | 300 | 189 |

After exploring the binary interactions between metals in the MOFs, trimetallic compositions were examined, combining Gd, Eu, and Yb into a single compound and producing more complex behavior. FIG. 3C shows the lifetime decay dynamics for the trimetallic compounds 10-13. The lifetimes for these compounds range from 122 µs to 300 µs and are modulated by both the ratio of Eu to Yb and the proportional amount of Gd separating them. The full effect of composition on visible lifetime, as well as the correlations for estimating intermediate values, is shown in FIG. 3D. In revealing the effect of composition on lifetime, composition and lifetime can be multiplexed to develop a continuum of compositions for any desired lifetime and vice versa.

The combination of metals present in each compound also has a significant effect on lifetime in the NIR. Diluting Yb with Gd has little effect on the lifetime of each compound, but the inclusion of Eu results in a significantly more complex decay with a long, low amplitude tail, taking tens to hundreds of times longer to fully decay. This change in decay rates occurs because, after the initial burst of energy from the linker excitation is gone, the long-lived Eu continues to feed the short-lived Yb.

The NIR emission decay curves were accurately modeled as biexponential decays. A biexponential decay equation can be fit to the experimental decay curve by least squares minimization, but this approach is necessarily iterative and can be complicated when applied to equations with multiple fit parameters. See B. B. Collier and M. J. McShane, *Anal. Chem.* 84, 4725 (2012). Therefore, a moments method was developed that enables the two decay times and the amplitude to be computed from three parameters that are numerically derived from the experimental decay curves (initial inverse decay rate, average decay time, and square root of the second moment of the decay).

Heterometallic Ordering

Having demonstrated that changes in lifetime are a consequence of both the ratio of the Eu donor and Yb acceptor, and the presence of the optically inactive Gd ions, it is noted that the dependence on all three creates a broad encoding space, with multiple possible compositions for a given lifetime and vice versa.

In the dimetallic compounds, the interactions between each RE are relatively simple because the inclusion of the inactive Gd ion does not significantly affect the lifetime of either Eu or Yb, as it does not participate in energy transfer. In other studies, dilution of a visible emitter by an inactive ion has been shown to affect the luminescence intensity or quantum yield of the compound examined, but its effect on the compound's lifetime was never explored. See R. Maouche et al., *Inorgan. Chem.* 60, 3707 (2021).

When the compound contains Eu and Yb, the lifetime of both visible and NIR emissions are affected. Because the $^2F_{5/2}$ excited state of Yb lies below the $^5D_0$ excited state of Eu, energy is transferred non-radiatively from Eu to Yb. Yb has a significantly shorter lifetime than Eu and emits the transferred energy in the NIR range. The draining of energy from the high energy Eu excited states to the low energy Yb excited states causes a significant reduction in the visible lifetime and a simultaneous lengthening in the NIR lifetime. The relative lifetimes of each compound in this case are determined only by the ratio of Eu to Yb present in each.

In trimetallic compounds, the Gd remains inactive, but provides physical spacing between the Eu and Yb ions. This modulation effect is most visible at the extremes of composition. For example, the equimolar compound 13 has a characteristic visible lifetime of 189 µs, but the addition of a significant amount of Eu (compound 10) extends the visible lifetime to 240 µs, and a further addition of Gd (compound 12) increases the visible lifetime to 300 µs. Because the physical separation caused by Gd effectively prevents energy transfer between Eu and Yb, geometric proximity has a greater impact on lifetime than the Eu-to-Yb ratio alone.

Figure 4:
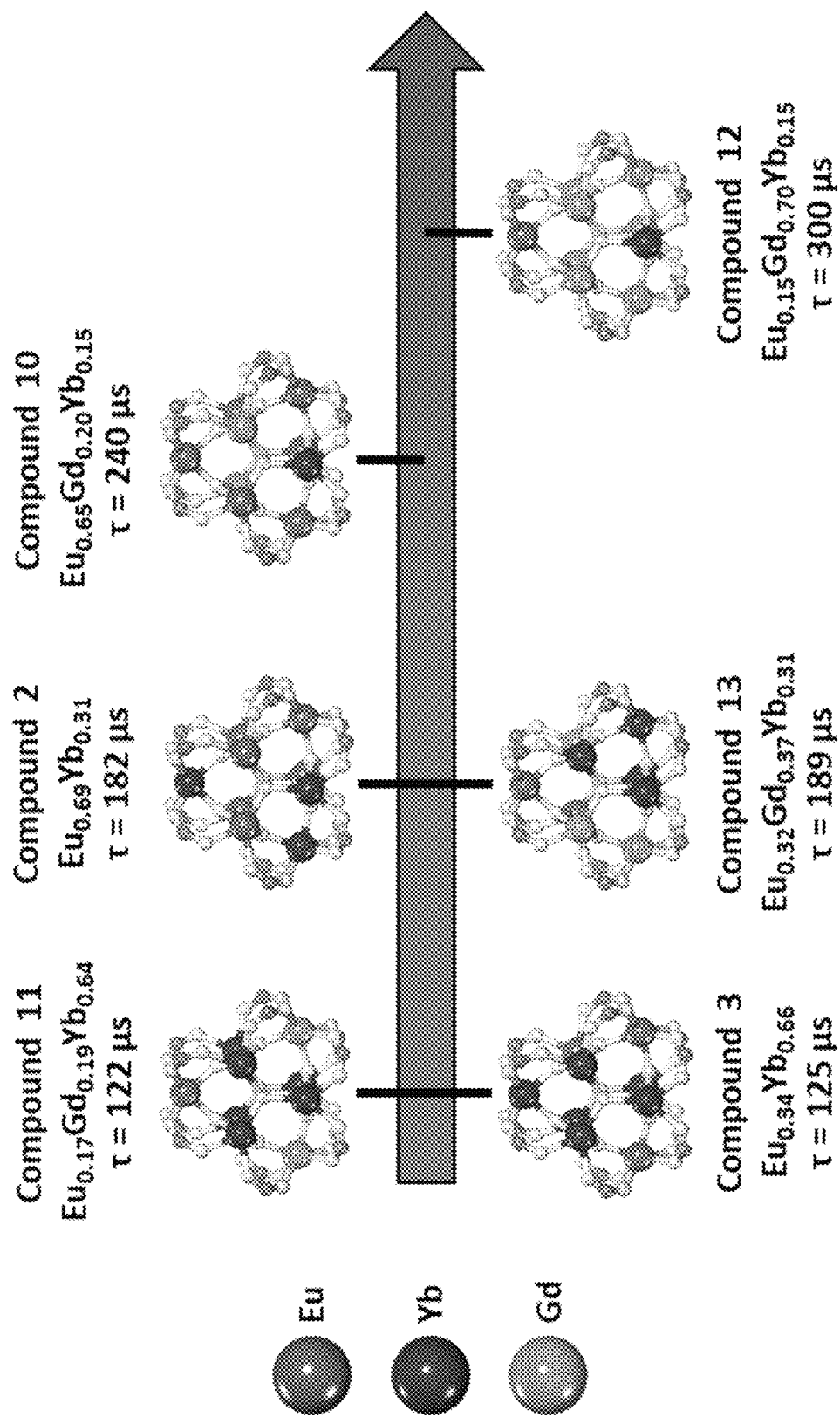
FIG. 4 is an illustration of the effect of composition on visible lifetime for different compounds using representative clusters based on bulk composition. The lifetime of a compound is determined by the probability of a Yb metal center (blue sphere) neighboring an Eu metal center (red sphere) and receiving energy from it. The presence of a Gd metal center (green sphere) reduces the probability that an Eu center will have a neighboring Yb center.

This concept was demonstrated using a unique averaging approach to metal ordering at the individual cluster level. Based on the evidence provided by the lifetime measurements, FIG. 4 visually represents mixed metal clusters. The average cluster composition for each compound was determined by dividing the nine metal ions according to the bulk composition. This visualization explains how different compositions can produce identical lifetimes in a three-metal system, and how compositions with identical quantities of visible emitters can have vastly different lifetimes. For example, compounds 11 and 12 contain nearly identical quantities of Eu, but the presence of Gd in compound 12 acts as a barrier to energy transfer and dramatically lengthens the lifetime.

Encoding Via Luminescence Lifetime

Because the time scale of luminescence decay in these materials is on the scale of tens to hundreds of microseconds in both the visible and NIR ranges, it can be decoded with relatively unsophisticated interrogation equipment, unlike tags with nanosecond-scale lifetimes. See S. Kalytchuk et al., *ACS Appl. Mater. Interfaces* 10, 29902 (2018); and S. Yakunin et al., *Nat. Commun.* 12, 981 (2021). Further, because the lifetime encoding is invisible to the unaided eye, the tag can also be covert, visible only to those who know the correct method of interrogation.

To demonstrate the relative simplicity of interrogating these highly complex tags, a microplate reader was used to measure standard and delayed fluorescence signatures. As proof-of-concept, the braille alphabet was used with two representative trimetallic compositions displaying very different decay profiles: compound 11 (short lifetime) and compound 12 (long lifetime). Utilizing the braille alphabet as an encoding method is advantageous because it is already a coded form and is also less complex than using a dot matrix for each letter.

To facilitate suspension of the MOF particles in ethanol, the MOFs were mechanically ground to reduce particle size. PXRD spectra and lifetimes of these ground samples confirm that the size reduction did not interfere with their crystallinity or decay dynamics. The PL spectra of both ground samples are indistinguishable to the microplate reader.

Standard fluorescence excitation and emission can be used to encode different three letter sequences. This method encodes based on emission alone (without differentiating by lifetime) and could be interrogated using a microplate reader or simply visually examined using a UV lamp.

Figures 5A, 5B:
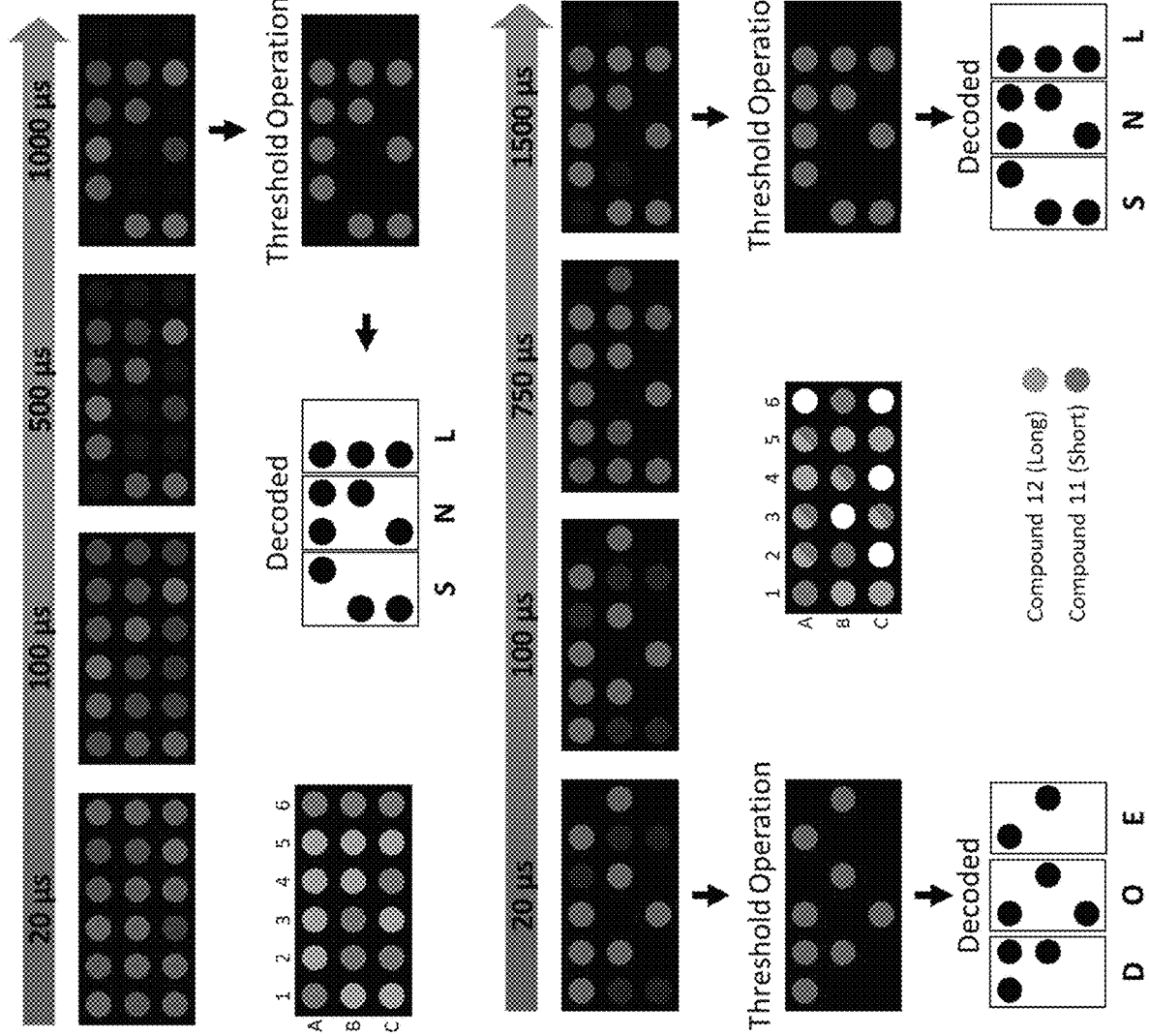
FIGS. 5A and 5B show representations of an encoded message utilizing the braille alphabet in a 96 well plate.

A dynamic tag was then created which presents a nearly uniform fluorescence signature (an undifferentiated 3×6 block of dots) under the standard static excitation and emission method; the braille code is only revealed if measurements are taken with the correct delay after pulsed excitation, as shown in FIG. 5A. Correct interrogation of the dynamic tag requires a threshold operation at a specified time and intensity (above which a dot is considered filled and below which a dot is considered blank).

As a final test, two separate 3 letter codes were overlaid, using standard fluorescence excitation and emission for one signature and delayed fluorescence for the second signature to create a double-encoded dynamic tag. FIG. 5B shows a tag utilizing two different compounds overlayed within the same set of 3×6 wells. In this case, one pattern of dots is brightest under standard excitation and emission or after short delays because of the concentration of compounds present. However, when measurements are taken after a delay from pulsed excitation, the brightness becomes dependent on lifetime rather than concentration, and a different pattern is shown. As in the dynamic tag above, both a correct threshold value and a correct time delay are required in order to decode the tag.

Figure 6E:
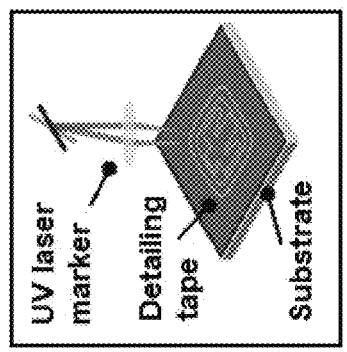
Figure 6D:
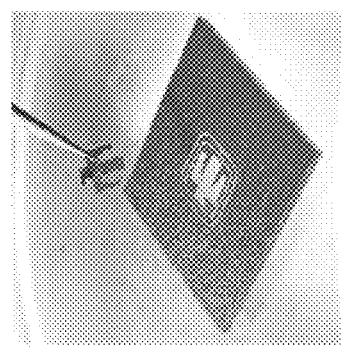
Figure 6C:
Figure 6B:
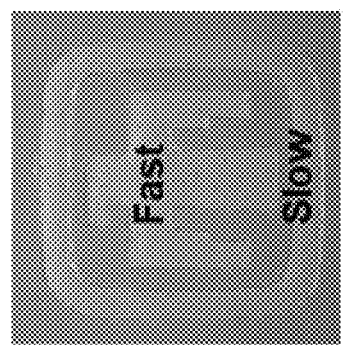
Figure 6A:
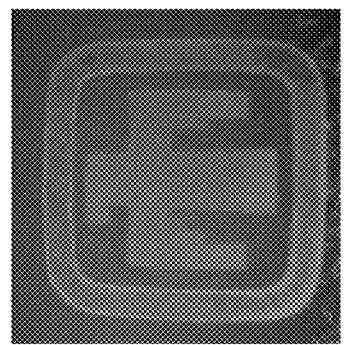

Materials with tunable lifetimes can be directly incorporated into printable inks to provide authentication for security documents, packaging, etc. To demonstrate this process, a transparent thunderbird logo containing discrete regions of short and long lifetime pigments (compounds 11 and 12) was patterned onto a transparent substrate, as shown in FIGS. 6A-6E. Examination with a static UV light source reveals the logo in its entirety (FIG. 6E), but differentiation of the distinct materials requires a high frame-rate camera. A schematic illustration of the high-speed imaging setup is shown in FIG. 6F. The light source used was a Quantel Q-smart twin laser set, run independently to produce a single pulse. The beam energy was 5 mJ/pulse, at a repetition rate of 10 Hz. A 23 mm diameter beam was incident upon the sample. For the lifetime measurement, two high-speed cameras were used: a broadband Vision Research v2511 running at 25,000 frames per second (fps), with an exposure of 39.54 µs; and a color Vision Research v1212c running at 12,000 fps with an exposure of 82.59 µs. Both cameras used 105 mm macro lenses at f/2.8 for the small tag and f/8 for the large one. The cameras resolution was set at their maximum of 1280×800 pixels. Digital high-speed imaging of the logo after pulsed excitation (FIG. 6G) shows the distinct decay rates of each compound, with decay profiles that match what is expected based on prior measurements of the compounds alone (FIG. 6H). This result confirms both control over the lifetime and the utility of that control in a practical setting for tag materials. These patterns were generated by laser direct write printing and the use of a laser-cut stencil, but could be readily adapted to other approaches, including flexography/(micro) stamping, ink-jet, and additive manufacturing (e.g., direct-ink write).

Additional layers of encoding can be introduced either through the presence of different emitting REs or their ratios (i.e., differentiating the encoding via spectra or color) or through the presence of inactive REs like Gd that are detectable via X-ray fluorescence or EDS (i.e., differentiating by composition independent of the measurable spectra). The continuum of lifetimes and compositions displayed in FIG. 3D allows composition, spectrum, and lifetime to be decoupled from each other, dramatically expanding the potential space for multilayered encoding. The scale of the visible lifetimes and presence of NIR signal provide examples of covert layers of encoding, in addition to the overt encoding based on visible emission.

The present invention has been described as a tunable rare earth MOFs for complex optical tags. It will be understood that the above description is merely illustrative of the applications of the principles of the present invention, the scope of which is to be determined by the claims viewed in light of the specification. Other variants and modifications of the invention will be apparent to those of skill in the art.

We claim:

1. An optical tag comprising a rare earth metal-organic framework (REMOF), the REMOF comprising at least one high-energy donor rare earth and at least one lower-energy acceptor rare earth, wherein the rare earths are arranged in nonanuclear heterometallic clusters interconnected by carboxylic acid-based linkers.

2. The optical tag of claim 1, wherein the at least one high-energy donor rare earth comprises Eu, Tb, Pr, Sm, or Dy.

3. The optical tag of claim 1, wherein the at least one lower-energy acceptor rare earth comprises Yb, Nd, or Er.

4. The optical tag of claim 1, further comprising at least one optically inactive higher-energy rare earth that modulates the distance between the at least one high-energy donor rare earth and the at least one lower-energy acceptor rare earth, thereby modifying a luminescence lifetime of the at least one high-energy donor rare earth or the at least one lower-energy acceptor rare earth.

5. The optical tag of claim 4, wherein the composition of the at least one high-energy donor rare earth, the at least one lower-energy acceptor rare earth, and the at least one optically inactive higher-energy rare earth are selected to provide a desired luminescence lifetime for the at least one high-energy donor rare earth or the at least one lower-energy acceptor rare earth.

6. The optical tag of claim 4, wherein the at least one optically inactive higher-energy rare earth comprises Gd, La, or Y.

7. The optical tag of claim 1, wherein the carboxylic acid-based linker comprises a di-, tri-, tetra-, or hexacarboxylic acid.

8. The optical tag of claim 7, wherein the dicarboxylic acid-based linker comprises 4,4'-stilbenedicarboxylic acid, 2,2'-dinitro-4,4'-stilbenedicarboxylic acid, 2'2-diamino-4,4'-stilbenedicarboxylic acid, 2,5-dihydroxyterephthalic acid, 4,4'-biphenyl dicarboxylic acid, or 1,4-napthalene dicarboxylic acid.

9. The optical tag of claim 7, wherein the tricarboxylic acid comprises 1,3,5-tris(4-carboxyphenyl)benzene, 4,4',4"-5-Triazine-2,4,6-triyl-tribenzoic acid, or 1,3,5-tris(4'-carboxy [1,1'-biphenyl]-4-yl)benzene.

10. The optical tag of claim 7, wherein the tetracarboxylic acid comprises 1,2,4,5-tetrakis(4-carboxyphenyl)benzene, or 1,3,6,8-tetra(4-carboxyphenyl) pyrene.

11. The optical tag of claim 7, wherein the hexacarboxylic acid linker comprises 1,2,3,4,5,6-hexakis(4'-carboxylato(1,1'-biphenyl)-4-yl)benzene.

12. The optical tag of claim 1, wherein the composition of the at least one high-energy donor rare earth and the at least one lower-energy acceptor rare earth are selected to provide a desired luminescence lifetime for the at least one high-energy donor rare earth or the at least one lower-energy acceptor rare earth.

13. A method to optically tag an object, comprising:
associating an optical tag, comprising a rare earth metal-organic framework (REMOF), the REMOF comprising at least one high-energy donor rare earth and at least one lower-energy acceptor rare earth, wherein the rare earths are arranged in nonanuclear heterometallic clusters interconnected by carboxylic acid-based linkers, with the object; and
interrogating at least two encoding properties of the optical tag in order to authenticate the object.

14. The method of claim 13, wherein the at least two encoding properties comprises an emission spectrum from at least one of the high-energy donor rare earth and/or an emission spectrum from at least one of the low-energy acceptor rare earth.

15. The method of claim 14, wherein the step of interrogating comprises optically exciting either the at least one high-energy donor rare earth or the carboxylic acid-based linker and measuring an emission spectrum of the optical tag.

16. The method of claim 13, wherein the at least two encoding properties comprises a luminescence lifetime from at least one of the high-energy donor rare earth and/or a luminescence lifetime of at least one of the low-energy acceptor rare earth.

17. The method of claim 16, wherein the step of interrogating comprises optically exciting either the at least one high-energy donor rare earth or the carboxylic acid-based linker and measuring a luminescence lifetime of the optical tag.

18. The method of claim 13, wherein the optical tag comprises an encoding pattern on the object.

19. The method of claim 18, wherein the optical tag comprises a multiple-encoded dynamic tag having at least two different concentrations of the at least one high-energy donor rare earth and the at least one lower-energy acceptor rare earth at different spatial locations of the encoded pattern, wherein the at least two different concentrations have similar emission spectra but different luminescence lifetimes and wherein the interrogating step comprises measuring the intensity of emission of the encoded pattern at a specified time after pulsed excitation of the optical tag.

20. The method of claim 13, wherein the optical tag further comprises at least one optically inactive higher-energy rare earth that modulates the distance between the at least one high-energy donor rare earth and the at least one lower-energy acceptor rare earth, thereby modifying a luminescence lifetime of the at least one high-energy donor rare earth or the at least one lower-energy acceptor rare earth.

21. The method of claim 13, wherein the at least two encoding properties comprises a composition of the at least one high-energy donor rare earth and the at least one lower-energy acceptor rare earth of the optical tag.

22. The method of claim 21, wherein the interrogating step comprises detecting the composition using X-ray fluorescence or energy dispersive spectroscopy.

* * * * *